(12) United States Patent
Lee et al.

(10) Patent No.: US 8,188,988 B2
(45) Date of Patent: May 29, 2012

(54) FINGER NAVIGATION DEVICE

(75) Inventors: Wui Pin Lee, Bayan Lepas (MY); Sai Mun Lee, Sg Nibong (MY); Hun Kwan Lee, Seberang Perai Selatan (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 532 days.

(21) Appl. No.: 12/464,542

(22) Filed: May 12, 2009

(65) Prior Publication Data

US 2010/0289775 A1    Nov. 18, 2010

(51) Int. Cl.
*G06F 3/042* (2006.01)
(52) U.S. Cl. .................... 345/176; 178/18.04; 178/18.09
(58) Field of Classification Search .......... 345/173–178; 382/107, 115–127; 178/18.01–18.09, 19.01–19.06
See application file for complete search history.

(56) References Cited

U.S. PATENT DOCUMENTS

| 7,177,451 | B2 | 2/2007 | Higuchi | |
| 7,214,953 | B2* | 5/2007 | Setlak et al. | 250/556 |
| 7,313,255 | B2* | 12/2007 | Machida et al. | 382/107 |
| 2004/0234107 | A1* | 11/2004 | Machida et al. | 382/107 |
| 2008/0049989 | A1 | 2/2008 | Iseri | |
| 2008/0180399 | A1 | 7/2008 | Cheng | |

FOREIGN PATENT DOCUMENTS

WO    WO 0169520    9/2001

\* cited by examiner

*Primary Examiner* — Vijay Shankar

(57) ABSTRACT

A finger navigation device is disclosed herein. An embodiment of the navigation device comprises a substrate; a light emitter located on the substrate; a photosensor located on the substrate; and a first cover located above the light emitter and the photosensor. The first cover has a first side and a second side, wherein the first side faces the substrate. A first lens is located in the first cover proximate the light emitter. An aperture is located in the first cover proximate the photosensor. A second cover faces the second side of the first cover and has a first surface proximate a transparent portion.

19 Claims, 5 Drawing Sheets

FINGER NAVIGATION DEVICE

BACKGROUND

Some electronic devices, such as cellular telephones, have menus or graphical user interfaces that are rather complex. In order to navigate through these menus, a user may move his finger over a navigator, which causes an icon associated with the menus to move. As electronic devices get smaller, the navigators must also get smaller so as not to limit the size of the electronic devices.

DETAILED DESCRIPTION

Figure 1:
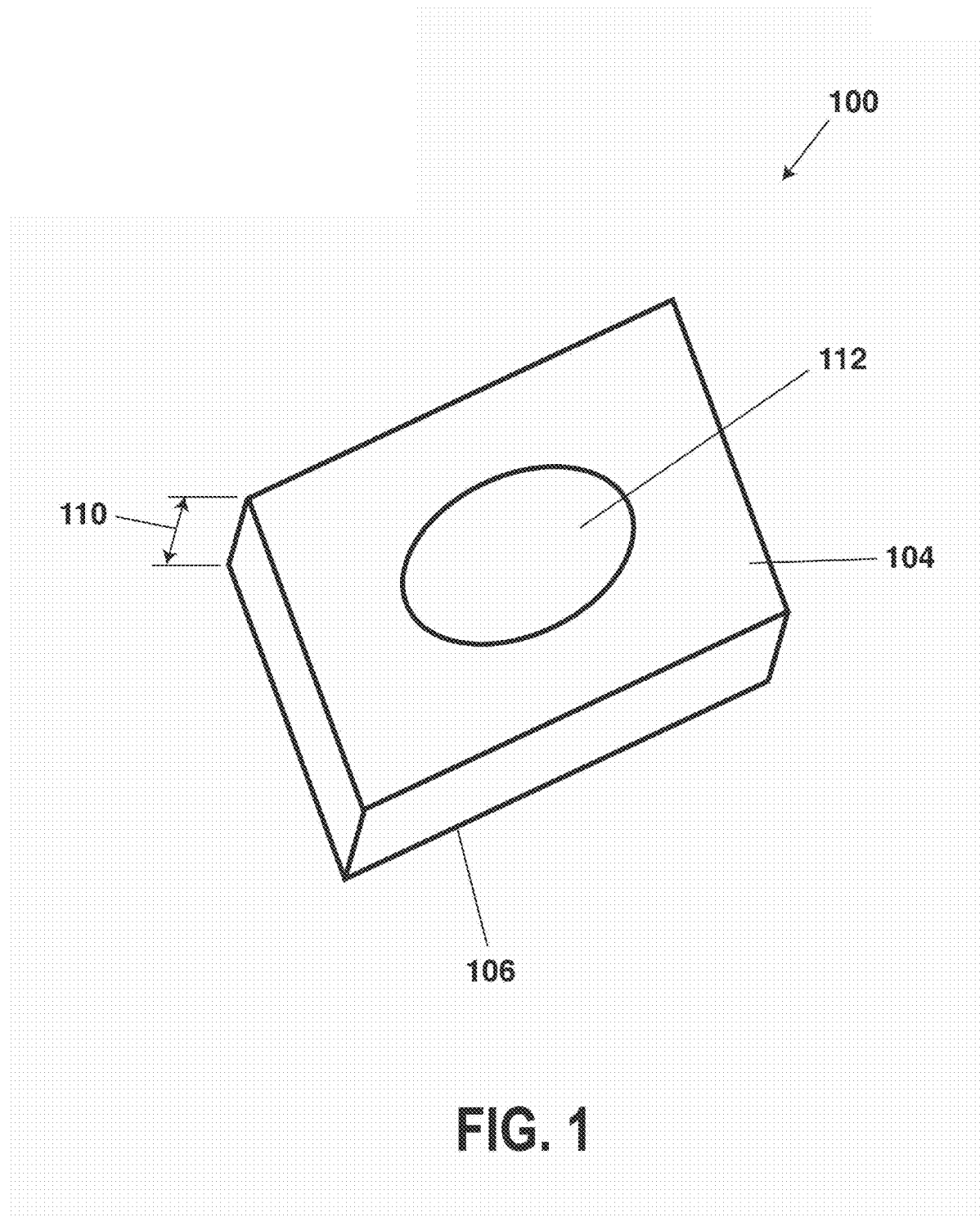
FIG. 1 is a top perspective view of an embodiment of a finger navigation device.

A finger navigation device 100, sometimes referred to simply as a navigation device, is shown in FIG. 1. The navigation device 100 has a top surface 104 and an opposite lower surface 106. A width 110 is the distance between the top surface 104 and the bottom surface 106. One advantage of the navigation device 100 is that the width 110 may be less than conventional navigation devices. The navigation device 100 may have a window or transparent portion 112 or the like that transmits light. The transparent portion 112 may be adapted for a user to slide his finger on the transparent portion 112.

Figure 2:
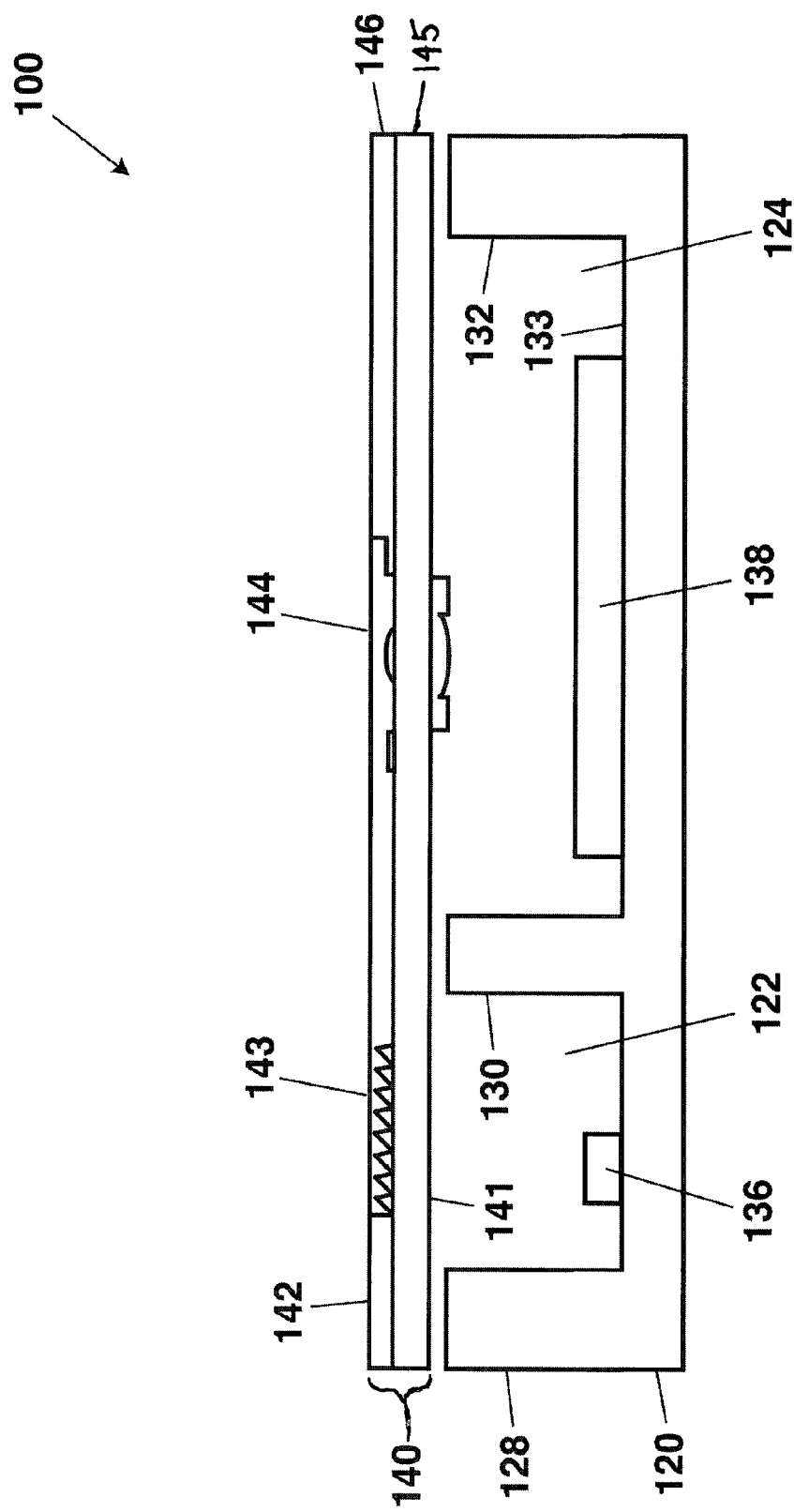
FIG. 2 is a side cut away view of an embodiment of the finger navigation device of FIG. 1.

A side cutaway view of an embodiment of the navigation device 100 is shown in FIG. 2. The navigation device 100 has a substrate 120 onto which conventional electronic devices and the like may be affixed. The navigation device 100 has two chambers, which are referred to individually as the first chamber 122 and the second chamber 124. A first wall 128 and a second wall 130 define the first chamber 122. The second wall 130 and a third wall 132 define the second chamber 124.

The substrate 120 may have a surface 133 from which the walls 128, 130, 132 extend. The surface may have electrical traces and other devices for conducting current. In addition, the surface may have electrical components attached thereto.

A light source 136 is affixed to the surface 133 of the substrate 120 and is located in the first chamber 122. The light source 136 may be a light-emitting diode (LED). A light detector or photosensor 138 is affixed to the substrate 120 and is located in the second chamber 124. In some embodiments, the photosensor 138 is an array of photosensors or photodetectors that can generate a two-dimensional image of an object. The chambers 122, 124 serve to eliminate direct light paths between the light source 136 and the photosensor 138. In the embodiment of FIG. 2, the wall 130 blocks direct light paths between the light source 136 and the photosensor 138. As described in greater detail below, only light reflected from a user proximate the transparent portion 112 will be incident to the photosensor 138.

A top 140 (sometimes referred to herein as a first cover) serves to enclose the chambers 122, 124. The top 140 has a first side 141 and a second side 142 opposite the first side 141. The first side 141 faces toward the surface 133 of the substrate 120. The top 140 may be made of a clear material, such as a clear plastic, that allows light to pass through the top 140. In other embodiments, the top 140 may have an opening or window that allows light to pass. The top 140 has a lens 143 (sometimes referred to as a first lens) proximate the first chamber 122. The lens 143 is described herein as being a diffractive lens, but it could be other types of lenses, such as a refractive lens. As described in greater detail below, the diffractive lens 143 causes light emitted from the light source 136 to diffract or bend. The diffractive lens 143 may be any optical device that changes the direction of light as the light passes through the device. The top 140 also has a lens assembly 144 (sometimes referred to as a second lens) that directs light from a user to the photosensor 138. In some embodiments, the lens assembly 144 is simply a lens. In other embodiments, the lens assembly 144 includes an aperture or an aperture stop.

The embodiment of the top 140 described above has the optical elements incorporated within the top 140. For example, the diffractive lens 143 and the lens assembly 144 may be embedded or incorporated within the top 140. In an embodiment, the top 140 is formed by a substrate 145 and an optical piece 146, with the substrate 145 forming the first side 141 of the top 140 and the optical piece 146 forming the second side 142 of the top 140. For example, as shown in FIG. 2 the optical piece 146 is located at the second side 142 of the top 140. As described in greater detail below, the top 140 may be fabricated by adding the optical piece 146 to the substrate 145 that constitutes the other portion of the top 140.

Figure 3:
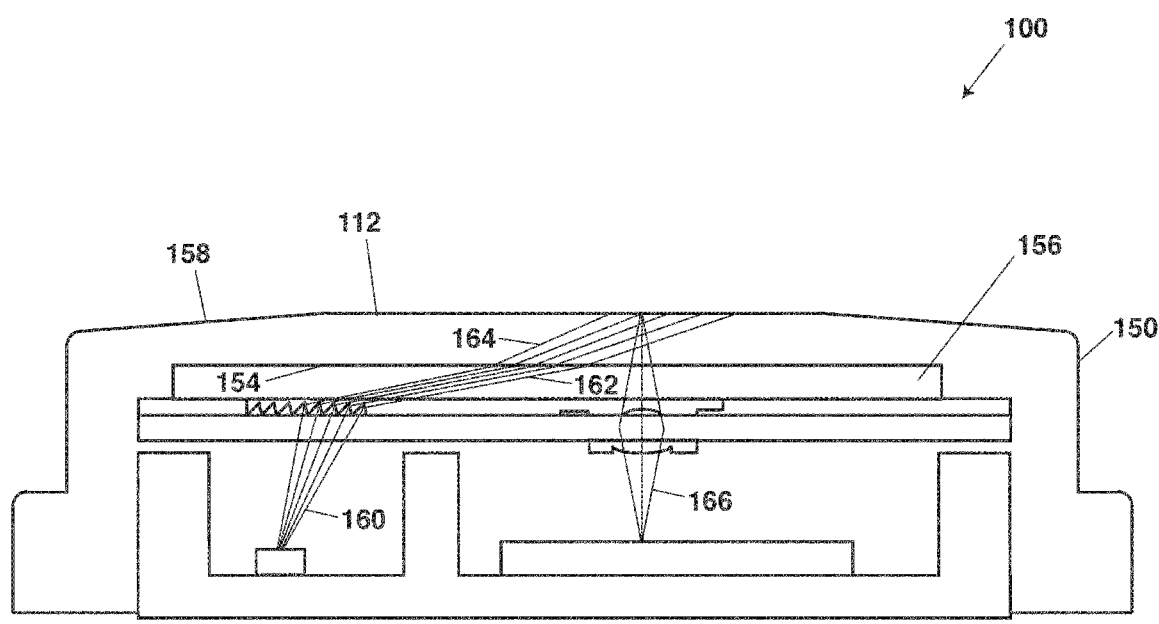
FIG. 3 is a side cut away view of the finger navigation device of FIG. 2 with the addition of a cover.

Referring to FIG. 3, a second cover 150 may serve as a housing for the navigation system 100. The second cover 150 may be transparent so that light from the light source 136 and light reflected or diffracted from a user may pass through the second cover 150. In other embodiments, the second cover 150 includes the above-described transparent portion 112. In either embodiment, the second cover 150 is sometimes referred to as having a window which enables the above-described light to pass through the second cover 150. The second cover 150 has a first surface 154 on a first side located proximate the second side 142 of the top 140. A gap 156 is located between the first surface 154 of the cover and the second side 142 of the top 140. The gap 156 enables light to extend therein and be diffracted by the transition from the gap 156 to the first surface 154 of the cover 150.

The cover 150 also has a second surface 158 on a second side that is opposite the first surface 154. The second surface 158 may be formed to fit within predetermined confines, such as within the operating surface of a cellular telephone. The transparent portion 112 of the second cover may be adapted or formed to receive a finger of a user. Thus, a user can move his finger relative to the transparent portion 112. As described in greater detail below, this movement will cause a curser or other computer menu item associated with the navigation device to change, move, or otherwise be selected.

The light emitted by the light source 136 is diffracted twice before it becomes incident with the user. This diffraction enables the height 110, FIG. 1, of the navigation device to be less than conventional devices. Such a low height 110 further enables the navigation device to be used in small electronic devices, such as cellular telephones.

Figure 5:
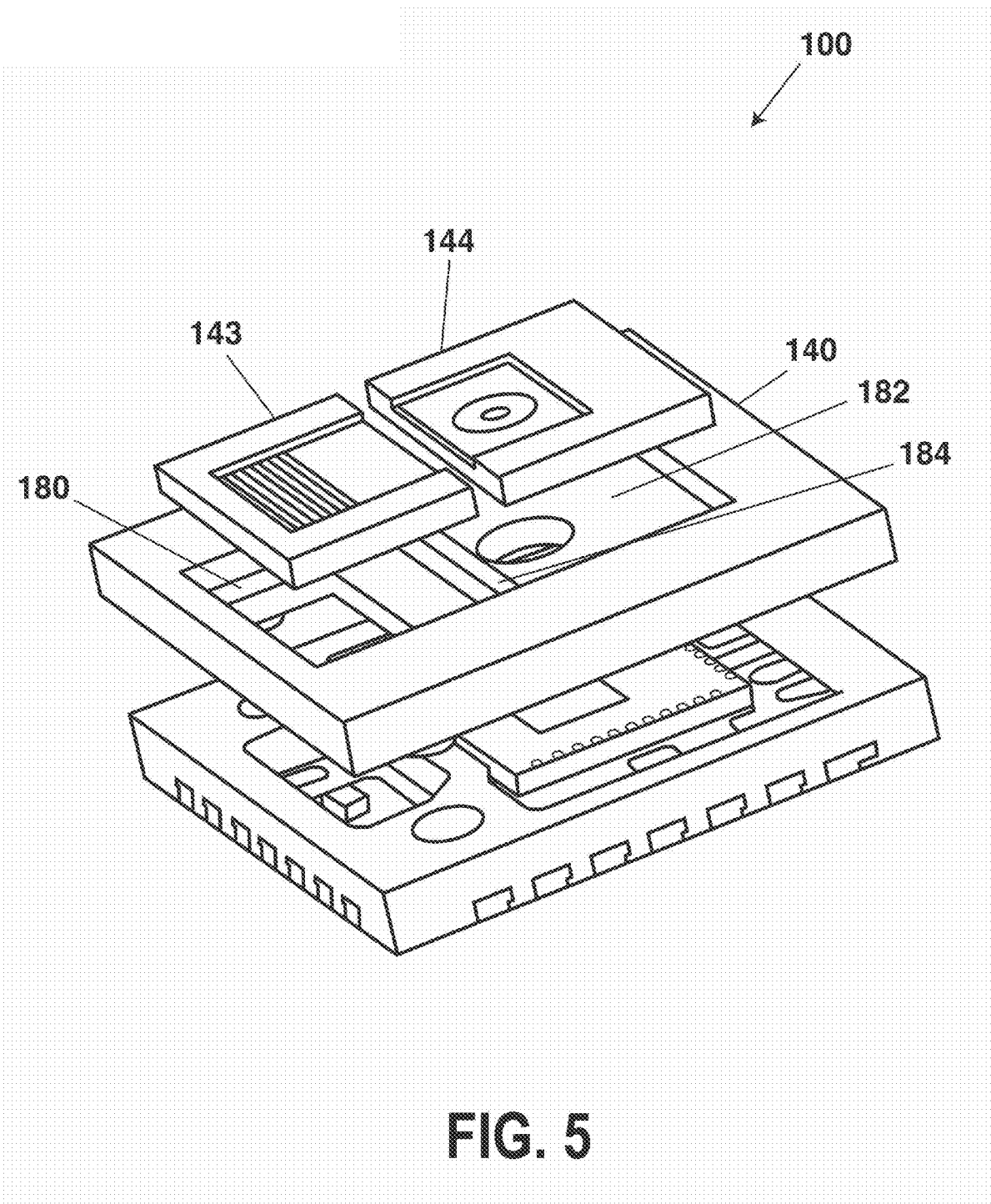
FIG. 5 is a top perspective view showing the components of another embodiment of the navigation device.

Another embodiment of the navigation device 100 is shown in FIG. 5. In this embodiment, the top 140 is configured to receive a separate diffractive lens 143 and lens assembly 144. The top 140 has a first recess 180 that receives the diffractive lens 143 and a second recess 182 that receives the lens assembly 144. In the embodiment of FIG. 5, the top 140 has a hole or aperture in the location of the first recess 180 and a hole or aperture in the location of the second recess 182. The holes enable light to pass through the top 140 and to the lenses 143, 144.

A wall 184 separates the first recess 180 from the second recess 182. Thus, the first recess 180 and the second recess 182 are optically isolated from each other.

Having described the components of the navigation device 100, its operation will now be described.

The navigation device 100 is connected to a computer or the like (not shown) that tracks a user's finger movement relative to the navigation device 100. Based on this relative movement, actions are taken by the computer. These actions may include moving a cursor on a screen or selecting items in a graphical user interface. In summary, the navigation device 100 functions similarly to a computer mouse.

With reference to FIG. 3, light is emitted from the light source 136. Because the light source 136 is located in the first chamber 122, the light will not be incident to the photosensor 138 until after it reflects from a user as described below. Some of the light emitted by the light source 136 travels toward the first surface 141 of the top 140 via a first light path 160. The light associated with the first light path 160 is incident to the diffractive lens 143 and is bent or diffracted along a second light path 162 toward the first surface 154 of the cover 150. The light that is incident with the first surface 154 of the cover 150 is bent or diffracted toward the second surface 158 of the second cover 150 along a third light path 164. As shown, the light associated with the third light path passes through the transparent portion 112. The first surface 154 of the second cover 150 proximate the transparent portion 112 is sometimes referred to as a diffractive element, a lens, or a second lens.

When the navigation device 100 is in use, a user has his finger or hand proximate or adjacent the transparent portion 112. Light associated with the third light path 164 is incident on and reflects from the user's finger. The reflected light passes back through the transparent portion 112 and through the lens assembly 144 via a fourth light path 166. The light associated with the fourth light path 166 is incident on the photosensor 138 where an image of the user's finger is focused onto the photosensor 138. As the user moves his finger relative to the transparent portion 112, the image of the finger focused onto the photosensor 138 moves accordingly. The photosensor 138 generates image data representative of the image of the user's finger.

A computer or processor (not shown) associated with the navigation device 100 has computer-readable code or the like stored therein that processes images generated by the photosensor 138. The processing determines the movement of the user's finger relative to the transparent portion 112 by analyzing the movement of the image focused on the photosensor 138. More specifically, as the user moves his finger relative to the transparent portion 112, the image of the finger focused onto the photosensor 138 also moves. This movement is analyzed and, based on the movement, a device associated with the navigation device 100 is affected. The movement of the user's finger may cause a cursor of a display to move. The movement may also cause a graphical user interface to open or an item to be selected.

Having described the operation of the navigation device 100, different methods of manufacturing the navigation device 100 will now be described.

Figure 4:
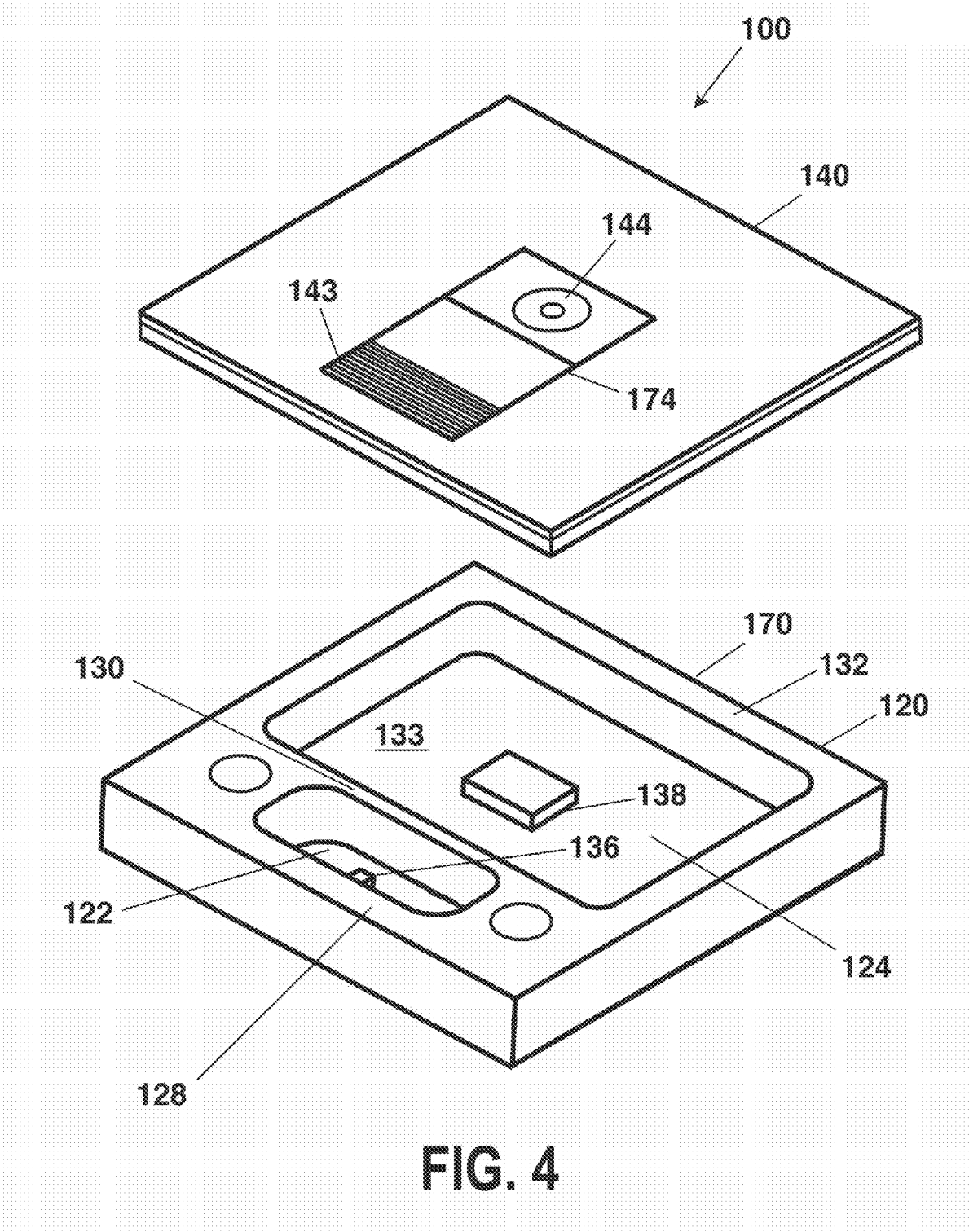
FIG. 4 is a top perspective view of some of the components of the navigation device of FIG. 1.

Referring to FIG. 4, the navigation device may consist of several different parts, including the substrate 120, the top 140, and the cover, which is not shown in FIG. 4. The substrate 120 may be formed from a sheet of material that has the walls 128, 130, 132 added thereto. The walls 128, 130, 132 may be a single block 170 of material that has the chambers 122, 124 formed therein.

The top 140 may be a single sheet of material that has an insert 174 located therein. The insert 174 may contain the diffractive lens 143 and the lens assembly 144 as described above. The top may be fabricated by cutting the top 140 with an opening sized to receive the insert 174. The insert may then be affixed to the opening. At this time, the top 140 may be affixed to the block 170. The second cover 150, FIG. 3, may then be added.

What is claimed is:

1. A finger navigation device comprising:
   a substrate;
   first, second, and third walls that extend from the substrate to define a first chamber and a second chamber;
   a light source located on the substrate in the first chamber;
   a photosensor located on the substrate in the second chamber;
   a top cover located above the light source and the photosensor, the top cover having a first side and a second side, wherein the first side faces the substrate and the second side faces away from the substrate, and wherein the top cover encloses the first chamber and the second chamber;
   a first lens located in the top cover proximate the light source and a second lens located in the top cover proximate the photosensor; and
   a second cover facing the second side of the top cover, the second cover having a first surface facing the top cover, a second surface opposite the first surface, and a transparent portion through which light can pass to a user;
   wherein the first lens of the top cover is configured to bend light emitted from the light source towards the transparent portion of the second cover.

2. The finger navigation device of claim 1, wherein the substrate, the light source, the photosensor, the top cover, the first lens, the aperture, and the second cover are configured such that light emitted from the light source;
   travels along a first light path extending between the light source and the first lens;
   is bent by the first lens and then travels along a second light path extending between the first lens and the first surface of the second cover;
   and then travels along a third light path extending between the first surface of the second cover and the second surface of the second cover;
   and, if reflected by a user, then travels along a fourth light path extending between the second surface of the second cover and the photosensor through the aperture.

3. The finger navigation device of claim 1, wherein the first lens is a diffractive lens and wherein the transparent portion of the second cover is aligned in an optical path with the aperture of the first cover and the photosensor.

4. A finger navigation device comprising:
   a substrate;
   a light source located on the substrate;
   a photosensor located on the substrate;
   a first cover located above the light source and the photosensor, the first cover having a first side and a second side, wherein the first side faces the substrate and the second side faces opposite the first side;
   a first lens located in the first cover proximate the light source;
   an aperture located in the first cover proximate the photosensor; and a second cover facing the second side of the first cover, the second cover having a first surface facing the first cover and a second surface opposite the first surface;

wherein the first lens is configured to bend light from the light source toward the first surface of the second cover and the first surface of the second cover bends light towards the second surface of the second cover.

5. The finger navigation device of claim 4, wherein the substrate, the light source, the photosensor, the first cover, the first lens, the aperture, and the second cover are configured such that light emitted from the light source;

travels along a first light path extending between the light source and the first lens;

is bent by the first lens and then travels along a second light path extending between the first lens and the first surface of the second cover;

and then travels along a third light path extending between the first surface of the second cover and the second surface of the second cover;

and, if reflected by a user, then travels along a fourth light path extending between the second surface of the second cover and the photosensor through the aperture.

6. The finger navigation device of claim 5, wherein the first lens is a diffractive lens and wherein the second cover comprises a transparent portion and wherein the transparent portion is aligned in an optical path with the aperture of the first cover and the photosensor.

7. The finger navigation device of claim 4, wherein the first lens is a diffractive lens.

8. The finger navigation device of claim 7, wherein the aperture comprises at least one lens.

9. The finger navigation device of claim 4, wherein the second cover comprises a transparent portion and wherein the transparent portion is aligned in an optical path with the aperture of the first cover and the photosensor.

10. The finger navigation device of claim 4, wherein the first lens is a diffractive lens and wherein the second cover comprises a transparent portion and wherein the transparent portion is aligned in an optical path with the aperture of the first cover and the photosensor.

11. The finger navigation device of claim 4, further comprising a first wall and a second wall that define a first chamber adjacent the substrate, wherein the light source is located in the first chamber, and wherein the second wall blocks direct light paths between the light source and the photosensor.

12. The finger navigation device of claim 11, further comprising a third wall, wherein the second wall and the third wall define a second chamber adjacent the substrate, wherein the photosensor is located in the second chamber, and wherein the second chamber is optically isolated from direct light emitted by the light source.

13. The finger navigation device of claim 4, further comprising a block located between the substrate and the first cover, the block defining a first chamber and a second chamber, wherein the light source is located in the first chamber and the photosensor is located in the second chamber.

14. The finger navigation device of claim 4, wherein the first cover comprises a substrate having an opening, wherein the first lens and the aperture are located on an insert, and wherein the insert is inserted into the opening.

15. The finger navigation device of claim 4, wherein the first cover is substantially transparent to light emitted by the light source.

16. The finger navigation device of claim 4, wherein the first cover has a first recess to receive the first lens and a second recess comprising the aperture.

17. The finger navigation device of claim 16, wherein the second recess receives a lens assembly that is aligned with the aperture.

18. A finger navigation device comprising:

a light source to emit light;

a photosensor array to detect light;

a cover having a transparent portion configured to pass light from the light source to a user, the cover being aligned with the photosensor array such that light reflected from the user passes back through the transparent portion to the photosensor array; and a lens in an optical path between the light source and the cover, the lens being configured to bend the light that is emitted from the light source towards the transparent portion of the cover;

wherein the lens is a planar optical element that is embedded within a planar structure that is fixed between the light source and the cover such that light emitted from the light source travels through the lens and then to the transparent portion of the cover.

19. The finger navigation device of claim 18, wherein the lens is a diffractive lens.

* * * * *